United States Patent
Ray et al.

(10) Patent No.: US 9,612,404 B2
(45) Date of Patent: Apr. 4, 2017

(54) PLATE SYSTEM FOR SECURING LOOSE FIBER TUBES

(71) Applicant: All Systems Broadband, Inc., Livermore, CA (US)

(72) Inventors: Craig D. Ray, Fuquay-Varina, NC (US); Shawn L. Heeter, Morrisville, NC (US)

(73) Assignee: All Systems Broadband, Inc., Livermore, CA (US)

( * ) Notice: Subject to any disclaimer, the term of this patent is extended or adjusted under 35 U.S.C. 154(b) by 0 days.

(21) Appl. No.: 14/922,756

(22) Filed: Oct. 26, 2015

(65) Prior Publication Data

US 2017/0059803 A1    Mar. 2, 2017

Related U.S. Application Data

(60) Provisional application No. 62/213,363, filed on Sep. 2, 2015.

(51) Int. Cl.
*G02B 6/36* (2006.01)
*G02B 6/44* (2006.01)

(52) U.S. Cl.
CPC ......... *G02B 6/3616* (2013.01); *G02B 6/3636* (2013.01); *G02B 6/4471* (2013.01)

(58) Field of Classification Search
CPC ... G02B 6/3616; G02B 6/4471; G02B 6/3636
See application file for complete search history.

(56) References Cited

U.S. PATENT DOCUMENTS

| | | | | |
|---|---|---|---|---|
| 6,144,792 A | * | 11/2000 | Kim ................... | H01S 3/06704 385/134 |
| 6,798,966 B2 | * | 9/2004 | Loh ........................ | G02B 6/293 385/134 |
| 2010/0284661 A1 | * | 11/2010 | Bran de Leon ...... | G02B 6/4454 385/135 |

* cited by examiner

*Primary Examiner* — Ryan Lepisto
(74) *Attorney, Agent, or Firm* — Murphy, Bilak & Homiller, PLLC

(57) ABSTRACT

A device for retaining a plurality of fiber tubes includes a bottom side, a top side, and outer sidewalls extending between the top and bottom sides. First and second groups of fiber tube receptacles in the top side and extend between first and second opposite facing outer sidewalls. First, second and third anchor points of the device each have a pair of fastener perforations extending through the top and bottom sides. First and second anchor points are arranged outside of the first and second groups of fiber tube receptacles. The third anchor point is arranged between the first and second groups. Each of the fiber tube receptacles has a first diameter in outer longitudinal regions and a second diameter in a central longitudinal region, the central longitudinal region being disposed between the outer regions. The first diameter is greater than the second diameter.

22 Claims, 16 Drawing Sheets

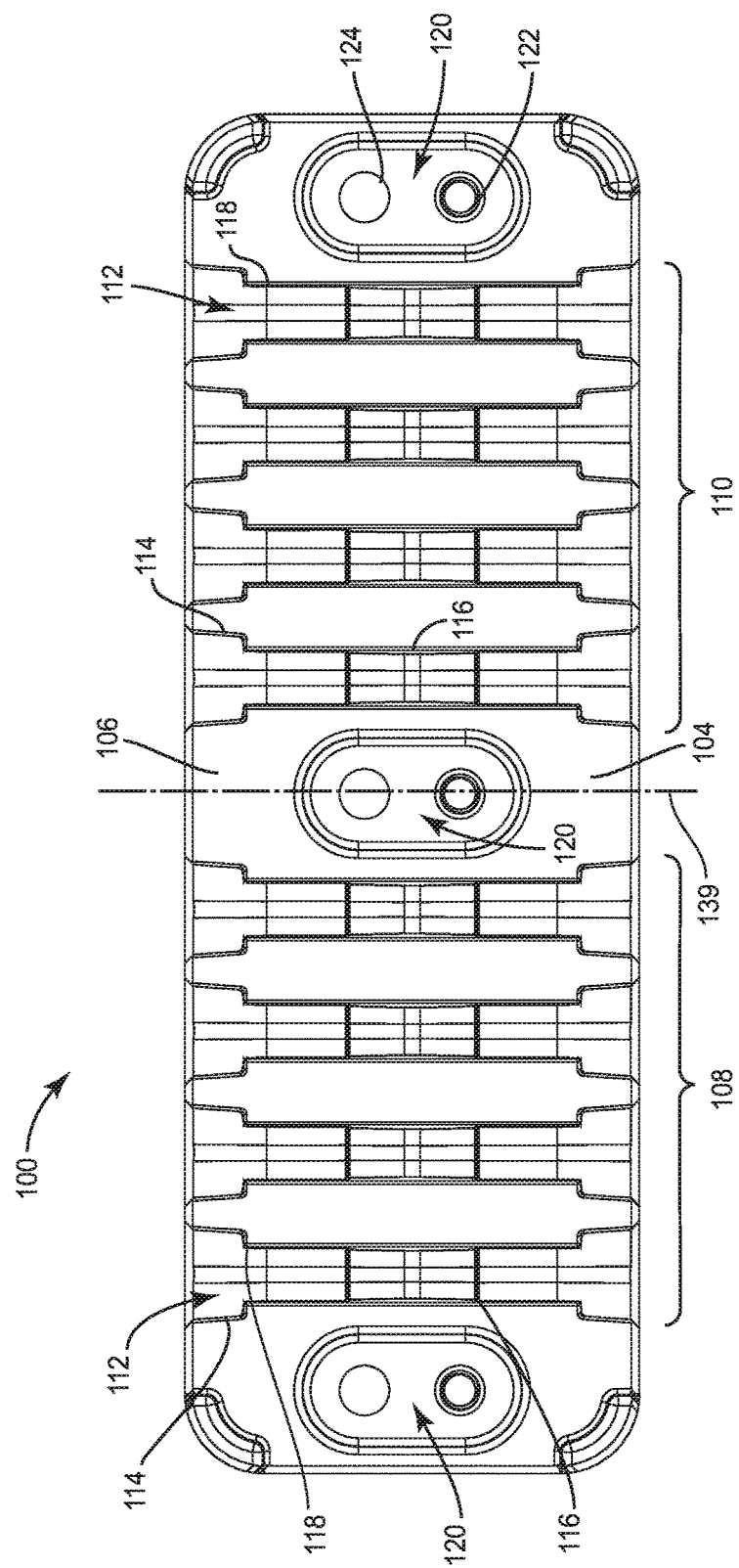

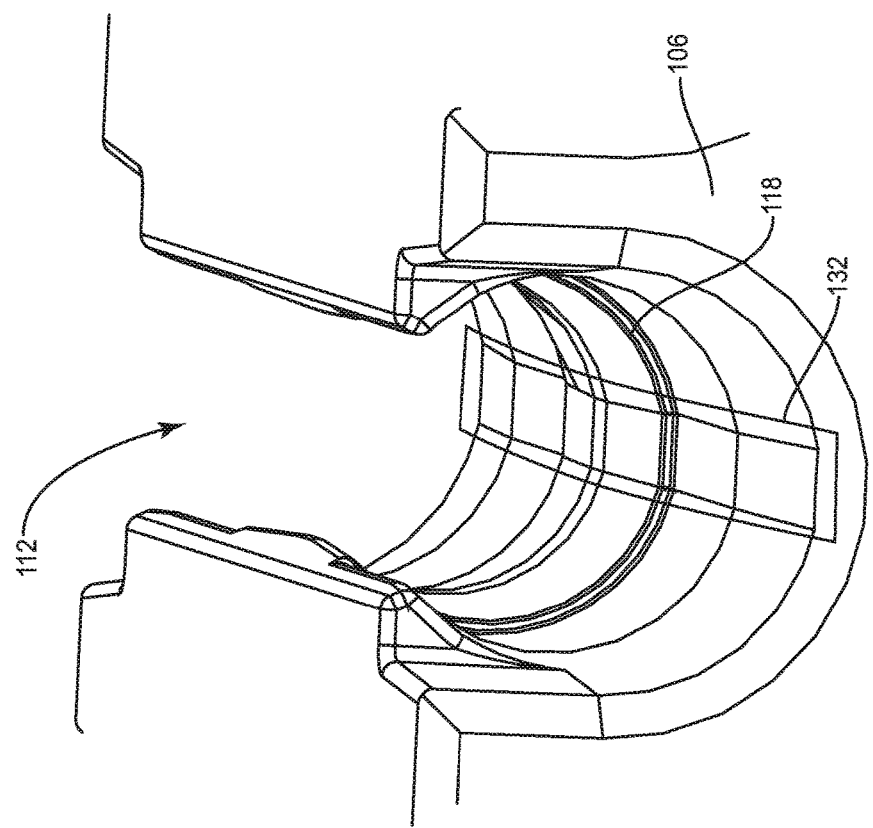

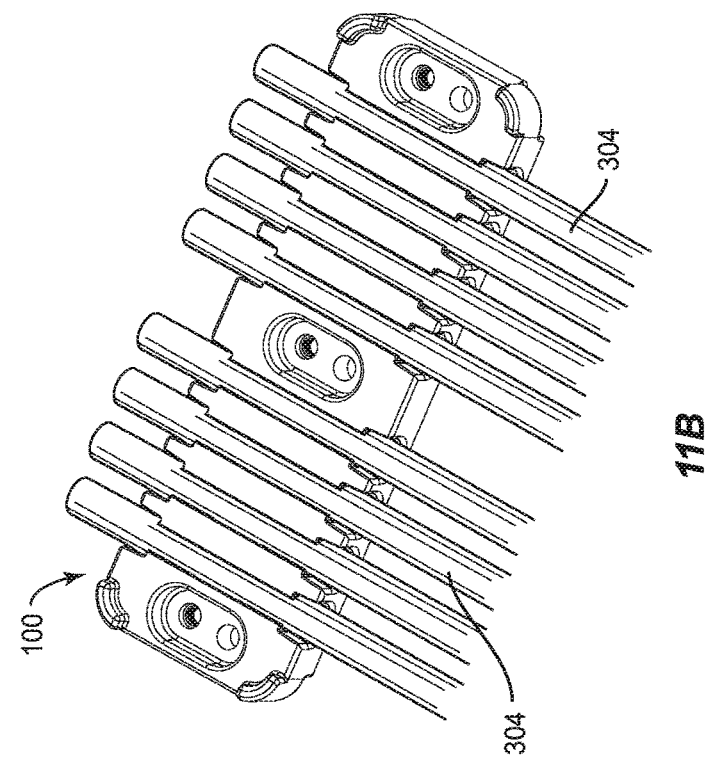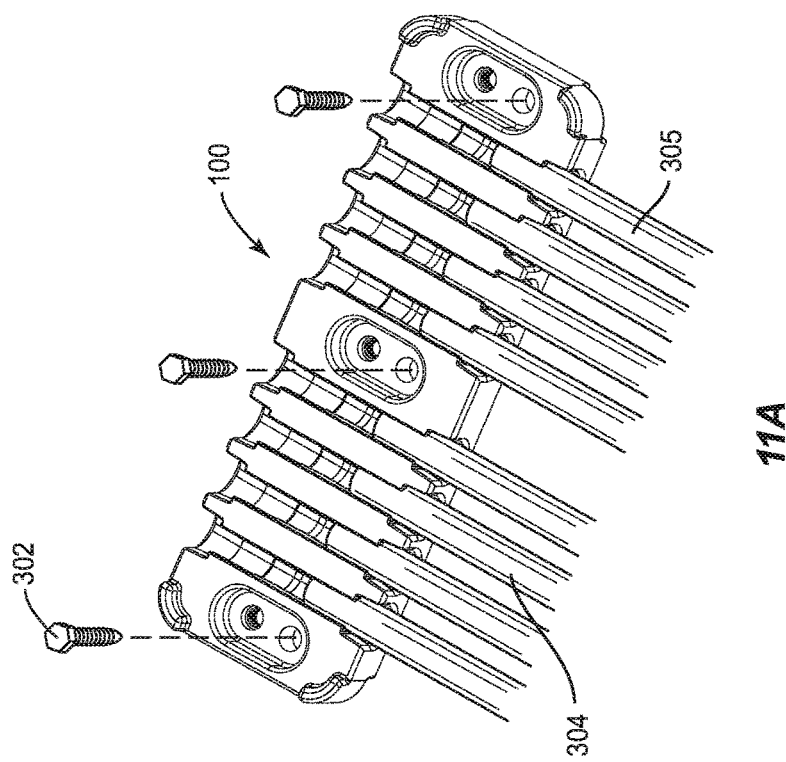
FIG. 11

PLATE SYSTEM FOR SECURING LOOSE FIBER TUBES

PRIORITY CLAIM

This application claims the benefit of and priority to U.S. Provisional Application Ser. No. 62/213,363 filed 2 Sep. 2015. The entire contents of said U.S. Provisional Application are incorporated herein by reference.

TECHNICAL FIELD

The present invention generally relates to optical communications equipment, and particularly relates to hardware for affixing cylindrical fiber optical cabling tubes together and/or to a fixed location.

BACKGROUND

Today's communication networks provide transport of voice, video and data to both residential and commercial customers, with more and more of those customers being connected by fiber optic cables. In these communication networks, information is transmitted from one location to another by sending pulses of light through the fiber optic cables. Fiber optic transmission provides several advantages over electrical transmission techniques, such as increased bandwidth and lower losses.

Fiber optic cables are often routed in narrow spaces of buildings (e.g., ducts) using microduct fiber tubes. Each microduct fiber tube may contain a number of jacketed fiber optic cables, which in turn contain a number of optical fibers. These interior fiber optic cables are protected by a cylindrical tube. The cylindrical tube is durable and protects the interior fibers from damaging environmental conditions, such as corners and other objects present inside the walls or ducts of a building. Microduct fiber tubes come in a variety of diameters, such as 8.5 mm (millimeters), 10.0 mm, 12.7 mm and 16 mm.

In many cases, installers use hardware to secure microduct fiber tubes together and/or to a flat surface, such as a wall. This hardware is typically secured at a location that is in close proximity to where the fibers exiting the fiber tubes enter a splice enclosure. This type of arrangement provides organization and an anchor point for the microduct tubes so as to prevent unwanted tension from being applied to the fiber tubes.

One hardware solution for installers of microduct fiber tubes is a stackable plate system that layers rows of microduct fiber tubes on top of another. These plates can be secured to the desired area. However, there are many drawbacks to this solution that make installation difficult and/or costly. For example, known stackable plate designs are tailored to the diameter of only one microduct fiber tube. Thus, if an installer wishes to use two different tube diameters (which is not uncommon), he or she must carry plates for each diameter. Furthermore, this solution is not space efficient, as each layer will typically have a number of unused slots. Furthermore, known stackable plate designs must be staggered on top of one another, with each successive layer laterally extending further than the previous one. This staggering is required so that there is adequate clearance to secure the plates together by a screw or other fastener. However, this staggering reduces space efficiency because of the lateral extension that each additional layer requires. Furthermore, known stackable plate designs are susceptible to bowing in which the pressure exerted on the plate by the microduct fiber tubes (which is necessary to ensure a secure connection) warps the plate, in particular at locations of the plate that are maximally spaced apart from the fasteners. Due to this bowing effect, the microduct fiber tubes may come loose from the plates.

SUMMARY

A device for retaining a plurality of fiber tubes is disclosed. According to an embodiment, the device includes a bottom side, a top side, and outer sidewalls extending between the top and bottom sides. First and second groups of fiber tube receptacles are formed in the top side and extend between first and second opposite facing ones of the outer sidewalls. The device further includes first, second and third anchor points, each of the anchor points having a pair of fastener perforations extending through the top and bottom sides. The first and second anchor points are arranged outside of the first and second groups of fiber tube receptacles. The third anchor point is arranged between the first and second groups of fiber tube receptacles. Each of the fiber tube receptacles has a first diameter in outer regions and a second diameter in a central region, the central region being disposed between the outer regions, the outer regions extending from the central region to one of the first and second outer sidewalls. The first diameter is greater than the second diameter.

A system for retaining a plurality of fiber tubes is disclosed. According to an embodiment, the system includes first and second fastening plates. Each of the fastening plates include a bottom side, a top side, and outer sidewalls extending between the top and bottom sides. First and second groups of fiber tube receptacles are formed in the top side and extend between first and second opposite facing ones of the outer sidewalls. The system further includes first, second and third anchor points, each of the anchor points having a pair of fastener perforations extending through the top and bottom sides. The first and second anchor points are arranged outside of the first and second groups of fiber tube receptacles. The third anchor point is arranged between the first and second groups of fiber tube receptacles.

Of course, the present invention is not limited to the above features and advantages. Indeed, those skilled in the art will recognize additional features and advantages upon reading the following detailed description, and upon viewing the accompanying drawings.

BRIEF DESCRIPTION OF THE DRAWINGS

FIGS. 3A and 3B, depicts a bottom side of the fastening plate of FIG. 1, according to an embodiment.

FIGS. 4A and 4B, depicts the fastening plate of FIG. 1 from a top-view perspective, according to an embodiment.

FIG. 5 depicts a close up view of one of the fiber tube receptacles of the fastening plate of FIG. 1, according to an embodiment.

FIGS. 8A and 8B, depicts the fastening plate with a pair of fingers extending away from end sides of the fastening plates, according to an embodiment. FIG. 8A depicts one of the fastening plates and FIG. 8B depicts multiple ones of the fastening plates stacked on top of one another.

FIGS. 9A and 9B, depicts a lid that may be secured to one of the fastening plates, according to an embodiment. FIG. 9A depicts a lower side of the lid and FIG. 9B depicts an upper side of the lid.

FIG. 11, which includes FIGS. 11A and 11B, depicts fiber tubes being arranged in one of the fastening plates, according to an embodiment. FIG. 11A depicts larger diameter fiber tubes arranged in the fastening plate and FIG. 11B depicts smaller diameter fiber tubes arranged in the fastening plate.

DETAILED DESCRIPTION

Figure 1:
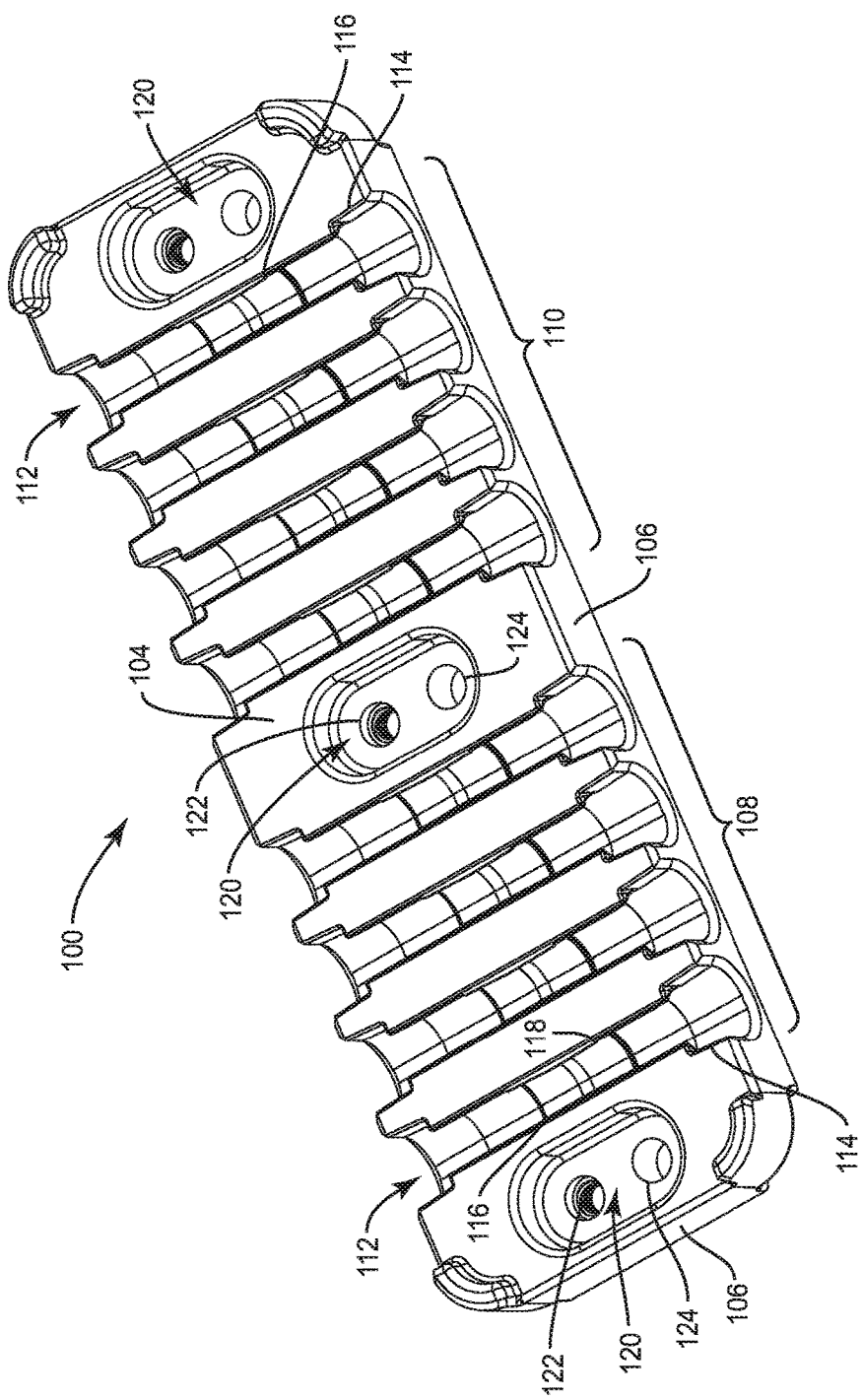
FIG. 1 depicts a fastening plate for securing fiber tubes, according to an embodiment.
Figure 2:
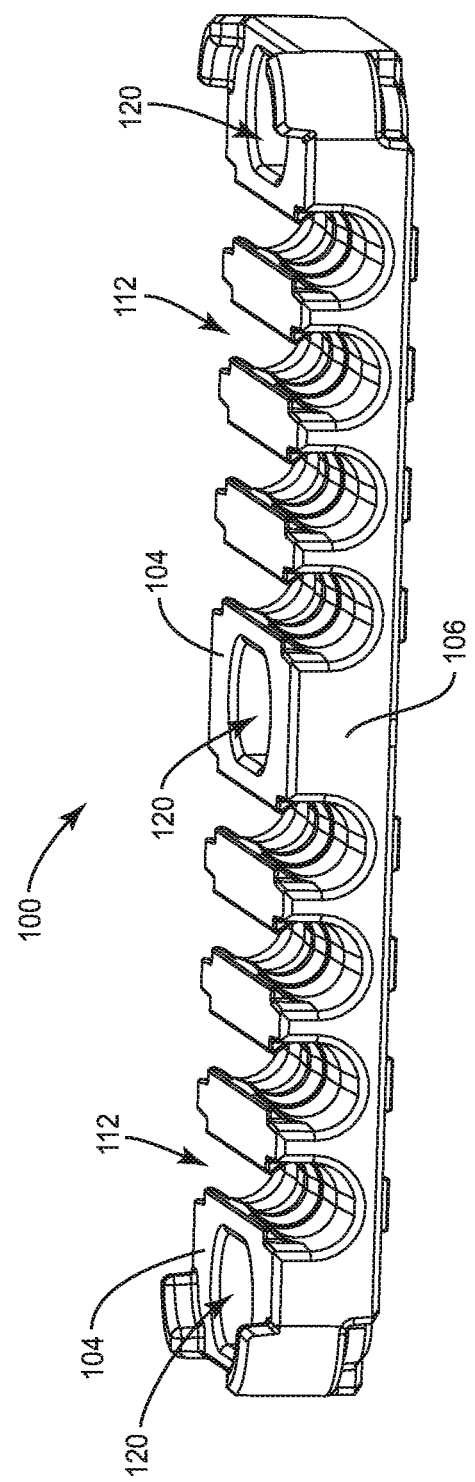
FIG. 2 depicts the fastening plate of FIG. 1 from a side-view perspective, according to an embodiment.

A system for retaining a plurality of fiber tubes (e.g., microduct fiber tubes) is described herein. The system includes a plurality (i.e., two or more) of fastening plates that can be layered on top of another. The fastening plates include partially cylindrical fiber tube receptacles that receive the fiber tubes. These partially cylindrical fiber tube receptacles are formed as indentations or trenches in a top side of each fastening plate. The fiber tubes may be completely routed through the fiber tube receptacles, or may be terminated within fiber tube receptacles, depending on the diameter of the fiber tubes. Two of the fastening plates are pressed together to apply pressure to any of the fiber tubes that are disposed between the fastening plates. The pressing force can be provided by conventional fasteners, such as screws, nuts, bolts, etc.

The fastening plate includes many advantageous features that make installation easy, cost-effective, and space-efficient. One advantageous feature relates to the suitability of the fastening plate to accommodate fiber tubes of different diameter. For example, according to an embodiment, the fiber tube receptacles of the fastening plate have a first diameter in outer regions and a second diameter that is smaller than the first diameter in a central region. The outer regions refer to an outer longitudinal section of the fiber tube receptacles and the central region refers to an inner longitudinal section of the fiber tube receptacles. Larger fiber tubes (e.g., 10.0 mm fiber tubes) can be secured in the outer regions. A step shaped transition between the outer regions and the inner regions allows an installer to insert the fiber tubes in the outer regions of the fiber tube receptacles until an end side of the fiber tube becomes flush against the step shaped transition. Smaller fiber tubes (e.g., 8.5 mm fiber tubes) rest in the central regions, and can completely extend through the fastening plates when the plates are pressed together.

Another advantageous feature of the embodiments described herein relates to the improved grip between the fastening plate and the fiber tubes. This improved grip is at least partially attributable to teeth or pads that are formed on the bottom side of the fastening plate. These teeth contact the fiber tubes when two of the fastening plates are pressed together so as to grip the fiber tubes. The fiber tubes may have a relatively pliable exterior jacket, and the teeth engage with and depress this exterior jacket. The teeth can have a vertically and horizontally varying height profile. This varying height profile can be optimized to improve the grip between the fastening plates and the fiber tubes, regardless of the diameter of the fiber tubes. Furthermore, this varying height profile can be optimized to account for bowing in the plates, such that the teeth remain engaged with the fiber tubes even after significant bowing. A removable lid with identically configured teeth can be placed on the uppermost fastening plate to provide the uppermost fiber tubes with the same securing pressure and gripping effect.

Another advantageous feature relates to the stackability of the fastening plates. According to embodiments described herein, each of the fastening plates is symmetrical with respect to a centerline that is arranged between and parallel to a longitudinal direction of the fiber tube receptacles. Furthermore, each of the fastening plates include anchor points running parallel to this centerline, with each of the anchor points having at least one threaded receptacle and at least one unthreaded fastener receptacle. The combination of these features allows the fastening plates to be stacked on top of one another with each successive fastening plate being rotated 180 degrees around the centerline and relative to the subjacent plate. A fastener combination (e.g., a bolt and nut) can be inserted through the unthreaded fastener receptacle on one of the fastening plates and received by the threaded fastener receptacle on the immediately subjacent fastening plate. This allows the fastening plates to be stacked on top of one another without any lateral staggering. In this way, any number of fastening plates (e.g., three, four, five, etc.) can be layered on top of one another without increasing the lateral space required for the installation.

Referring to FIGS. 1-4, a first fastening plate 100 for retaining a plurality of fiber tubes is depicted, from different perspectives. The first fastening plate 100 includes a bottom side 102, a top side 104, and outer sidewalls 106 extending between the bottom and top sides 102, 104. According to an embodiment, the outer sidewalls 106 are perpendicular to the bottom and top sides 102, 104.

The first fastening plate 100 includes first and second groups 108, 110 of fiber tube receptacles 112 formed in the top side 104. Each of the fiber tube receptacles 112 may be formed as indentations in the top side 104. That is, the fiber tube receptacles 112 extend below an uppermost surface of the top side 104 so as to form a recessed region of the first fastening plate 100. Each of the fiber tube receptacles 112 extend between first and second opposite facing ones of the outer sidewalls 106.

According to an embodiment, each of the fiber tube receptacles 112 forms a partial cylinder. From a cross-sectional perspective of the first fastening plate 100 in a plane that is parallel to the first and second outer sidewalls 106 (i.e., perpendicular to the longitudinal direction of the fiber tube receptacles 112), the fiber tube receptacles 112 form a circular sector. That is, the fiber tube receptacles 112 include curved sidewalls extending from an uppermost surface of the top side 104 towards the bottom side 102 of the fiber tube receptacles 112. According to an embodiment, an arc of the circular sector exceeds 180 degrees. This geometry serves to retain a fiber tube that is inserted in one of the fiber tube receptacles 112 from being pulled away from the first fastening plate 100 in a vertical direction (i.e., parallel with the first and second outer sidewalls 106).

According to an embodiment, the diameter of the fiber tube receptacles 112 varies in different longitudinal regions so as to accommodate to fiber tubes of varying diameter. For example, each of the fiber tube receptacles 112 may have a first diameter in outer regions 114 and a second diameter in a central region 116. The outer regions 114 are the longitudinal regions of the fiber tube receptacles 112 that directly adjoin the first and second opposite facing outer sidewalls 106. The central region 116 is disposed between the two outer regions 114 of one fiber tube receptacles 112. That is, the central region 116 is spaced apart from the first and second opposite facing outer sidewalls 106 by the outer regions 114.

According to an embodiment, each of the fiber tube receptacles 112 has a step shaped transition 118 between the outer regions 114 and the central region 116. At the step shaped transition 118, the diameter of fiber tube receptacle 112 abruptly changes, thus delineating the outer regions 114 from the central region 116. According to an embodiment, the step shaped transition 118 extends perpendicular to the bottom and top sides 102, 104.

According to an embodiment, the fastening plate 100 includes first, second and third anchor points 120 that allow the fastening plate 100 to be secured to another article, such as another one of the fastening plates 100. Each of the first, second and third anchor points 120 may include a pair of circular fastener perforations 122, 124 extending through the bottom and top sides 102, 104 of the fastening plate 100.

The circular fastener perforations may be dimensioned to receive a circular fastener, such as a screw, bolt or pin. As shown, the anchor points 120 may be formed in a recessed portion of the fastening plate 100 that is below the top side 104 and closer to the bottom side. This allows circular fastener to be secured in the anchor points 120 without the head of the fastener contacting or otherwise interfering with the adjacent article (e.g., another one of the fastening plates 100). The first and second anchor points 120 are arranged outside of the first and second groups 108, 110 of fiber tube receptacles 112. That is, the first and second anchor points 120 may be spaced closer to end sides of the fastening plate 100 than the first and second groups 108, 110 of fiber tube receptacles 112. The third anchor point may be arranged between the first and second groups 108, 110 of fiber tube receptacles 112.

Figure 3:
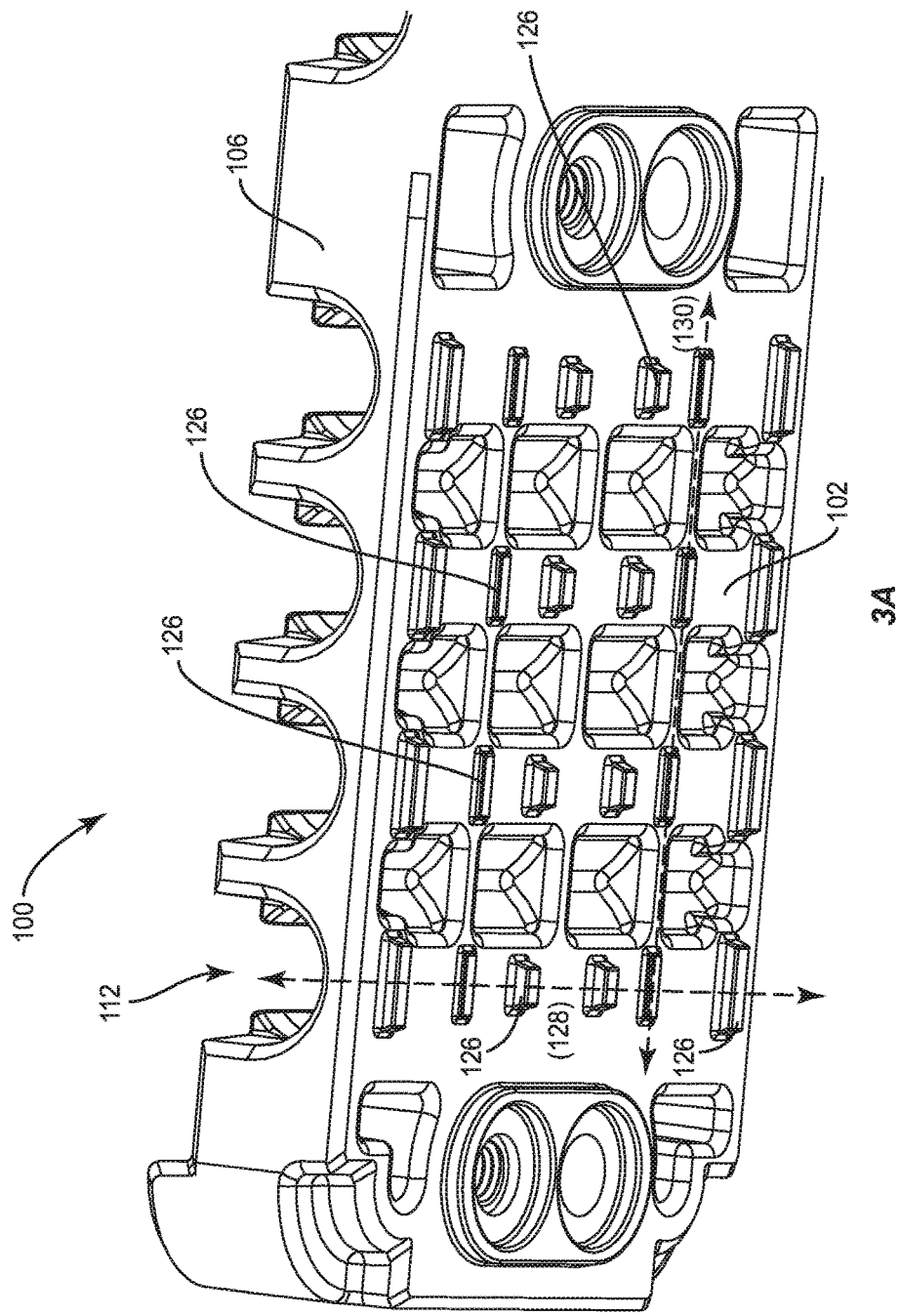
FIG. 3, which includes
Figure 3:
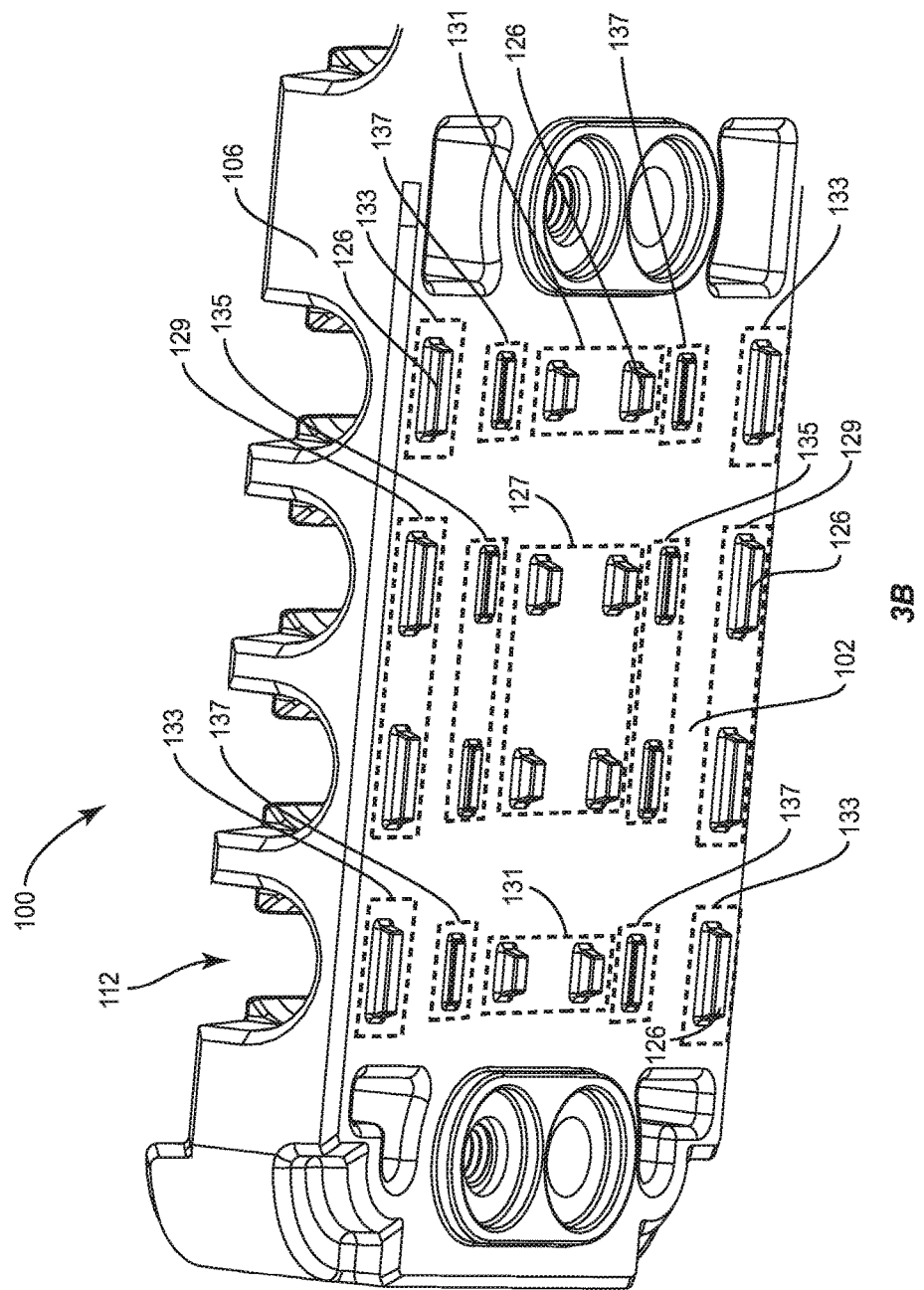

Referring to FIG. 3, the bottom side 102 of the fastening plate 100 is depicted. According to an embodiment, a plurality of teeth 126 is disposed on the bottom side 102. Each tooth 126 extends away from the bottom side 102 in an opposite direction as the outer sidewalls 106. The teeth 126 may be formed in vertical columns 128. Each of the columns 128 is parallel to and aligned with one of the fiber tube receptacles 112 on the opposite side of the fastening plate 100. The vertical columns 128 extend between the first and second opposite facing outer sidewalls 106 in the same longitudinal direction as the fiber tube receptacles 112. Furthermore, the teeth 126 in each column 128 are positioned to be directly beneath a longitudinal center of one of the fiber tube receptacles 112. Furthermore, the teeth 126 may also be formed in horizontal rows 130 that are perpendicular to the vertical columns 128. Each of the rows 130 includes a tooth 126 that is aligned with a corresponding fiber tube receptacle 112 in one of the first and second groups 108, 110. For example, in the embodiment of FIGS. 1-4, each row 130 includes four teeth 126, with one of the teeth 126 in each row being aligned with a fiber tube receptacle 112 on the opposite side of the fastening plate 100.

The height of the teeth 126 may be varied to optimize the friction and grip between an upper fastening plate 100 and the fiber tubes that are situated in the fiber tube receptacles 112 of a lower fastening plate 100 that is directly beneath the upper fastening plate 100. The teeth 126 in each column 128 may be grouped with respect to the diameter of fiber tubes that are situated in the fiber tube receptacles 112 of the lower fastening plate 100. There are two groups of teeth 126 that can grip the larger fiber tubes (i.e., the fiber tubes disposed in the outer regions 114) for each column 128. There is an additional inner group of teeth 126 in each column 128 that can grip the smaller diameter fiber tubes (i.e., the fiber tubes disposed in the central regions 116) for each column 128. According to an embodiment, for each column 128 of teeth 126, centrally located teeth 126 extend further away from the bottom side 102 than adjacent ones of the teeth 126 that are arranged on either side of the centrally located teeth 126. That is, the centrally located teeth 126 have a greater height than the adjacent ones of the teeth 126 in the same column 128. Furthermore, for each row 130 of teeth 126, central ones of the teeth 126 extend further away from the bottom side 102 than outer ones of the teeth 126 that are arranged on either side of the central teeth 126. For example, in the embodiment of FIGS. 1-4, the two central teeth 126 in each row 130 can be taller than the two outer teeth 126 in each row 130. Thus, the teeth 126 may have a vertically varying height profile and a horizontally varying height profile.

One example of a vertically and horizontally varying height profile for the teeth 126 will now be discussed with reference to FIG. 3B. In this example, the teeth 126 are organized in groups of varying height. That is, the teeth 126 in one group have a substantially identical height as the other teeth 126 that are part of a common group, but have a different height from the teeth 126 that are part of other groups. These groups, in order of tallest to shortest, are as follows: a first group 127 located at the center of each column 128 and row 130; a second group 129 located at the ends of each column 128 and the center of each row 130; a third group 131 located at the center of each column 128 and the ends of each row 130; a fourth group 133 located at the ends of each column 128 and at the ends of each row 130; a fifth group 135 located between the ends and the center of each column 128 and at the center of each row 130; and a sixth group 137 located between the ends and the center of each column 128 and at the ends of each row 130.

The shape of the teeth 126 may vary. In general, the teeth 126 are designed to engage with and grip with a durable exterior fiber cable jacket. According to an embodiment, the teeth have a square shape with sidewall surfaces that are substantially perpendicular to one another. These sidewall surfaces may be perpendicular or inclined, relative to the bottom side 102. Other geometries, such as circular or triangular are possible as well. Furthermore, the teeth 126 may have planar pad surfaces at an end that is opposite the bottom side 102.

FIGS. 4A and 4B depict the fastening plate 100 from a plan view perspective. A centerline 139 extends between the first and second outer sidewalls 106. The centerline 139 is parallel to the longitudinal extension of the fiber tube receptacles 112. The fastening plate 100 is symmetrical with respect to this centerline 139. That is, the features of the fastening plate 100 are identical, from the plan view perspective of FIGS. 4A and 4B from either side of the centerline 139. The first and second fastener perforations 122, 124 of the first, second and third second anchor points 120 are all parallel to the centerline 139. Furthermore, the centerline 139 bisects the first and second fastener perforations 122, 124 of the third anchor point 120. The first fastener perforations 122 of the first, second and third anchor points 120 may be threaded (i.e., adapted to insertably receive a threaded screw). Further, the second fastener perforations 124 of the first, second and third anchor points 120 may be unthreaded. With this configuration, successive ones the fastening plates 100 can be stacked on top of one another, with one of the fastening plates 100 being oriented in the first position as depicted as shown and FIG. 4A and the immediately adjacent fastening plate being oriented in the second position as shown in FIG. 4B (i.e., rotated 180 degrees). Due to the symmetry relative to the centerline 139, the fastening plate 100 presents the same configuration of the fiber tube receptacles 112 on the top side 104 and the same configuration of the teeth 126 on the bottom side. Meanwhile, because the first fastener perforations 122 are threaded and the second fastener perforations 124 are unthreaded, the fastening plates 100 can be layered such that the unthreaded fastener perforations of the upper fastening plate 100 (i.e., the second fastener perforation 124) are aligned with the threaded fastener perforation (i.e., the first fastener perforation 122) of the lower fastening plate 100, and vice versa. Thus, by layering the fastening plates 100 with alternating orientations, each of the fastening plates 100 can be secured to an immediately adjacent fastening plate 100 and the fasteners in the first and second fastener perforations 122, 124 do not interfere with one another.

Referring to FIG. 5, a close up view of one of the fiber tube receptacles 112 is shown. According to an embodiment, the fiber tube receptacle 112 includes a flat section 132 at a bottom of the partial cylinder. The flat section 132 may extend completely between the first and second opposite facing outer sidewalls 106. The presence of the flat section 132 in the fiber tube receptacle 112 improves the adaptability of the fiber tube receptacle 112 to fiber tubes of varying diameter. In general, the diameter of fiber tubes may deviate from a nominal diameter (e.g., 8.5 mm) due to a variety of effects, including manufacturing variations and contortion from manipulation, temperature, etc. If, for example, a fiber tube is slightly smaller than the nominal diameter, the flat section 132 provides a region of the fiber tube receptacle 112 that will press against the fiber tube and ensure that the fiber tube will be securely retained the fiber tube receptacle 112 despite being undersized.

Figure 6:
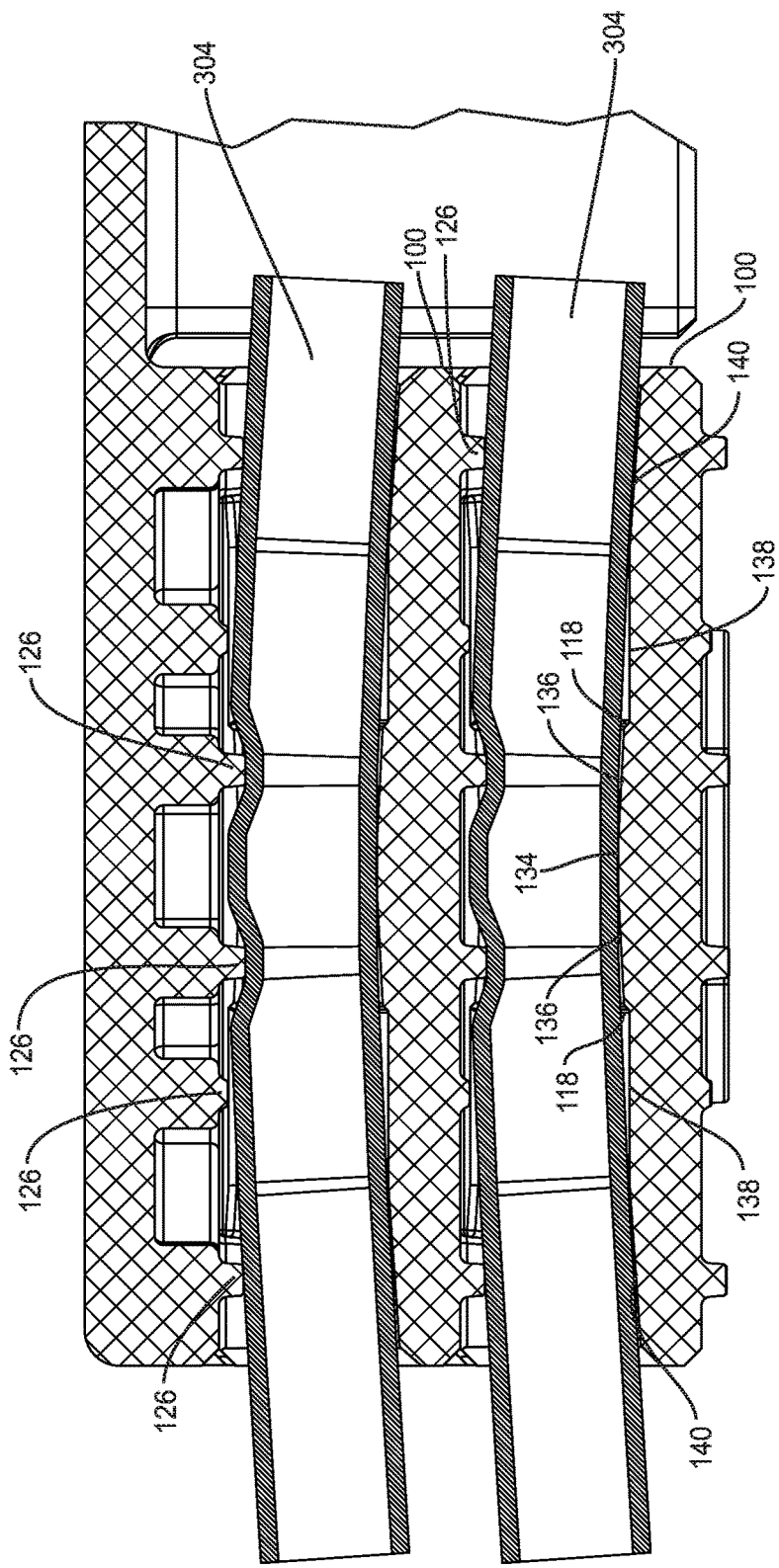
FIG. 6 depicts a cross-sectional view of an assembly of two fastening plates with a smaller diameter fiber tube being pressed together by the fastening plates, according to an embodiment.
Figure 7:
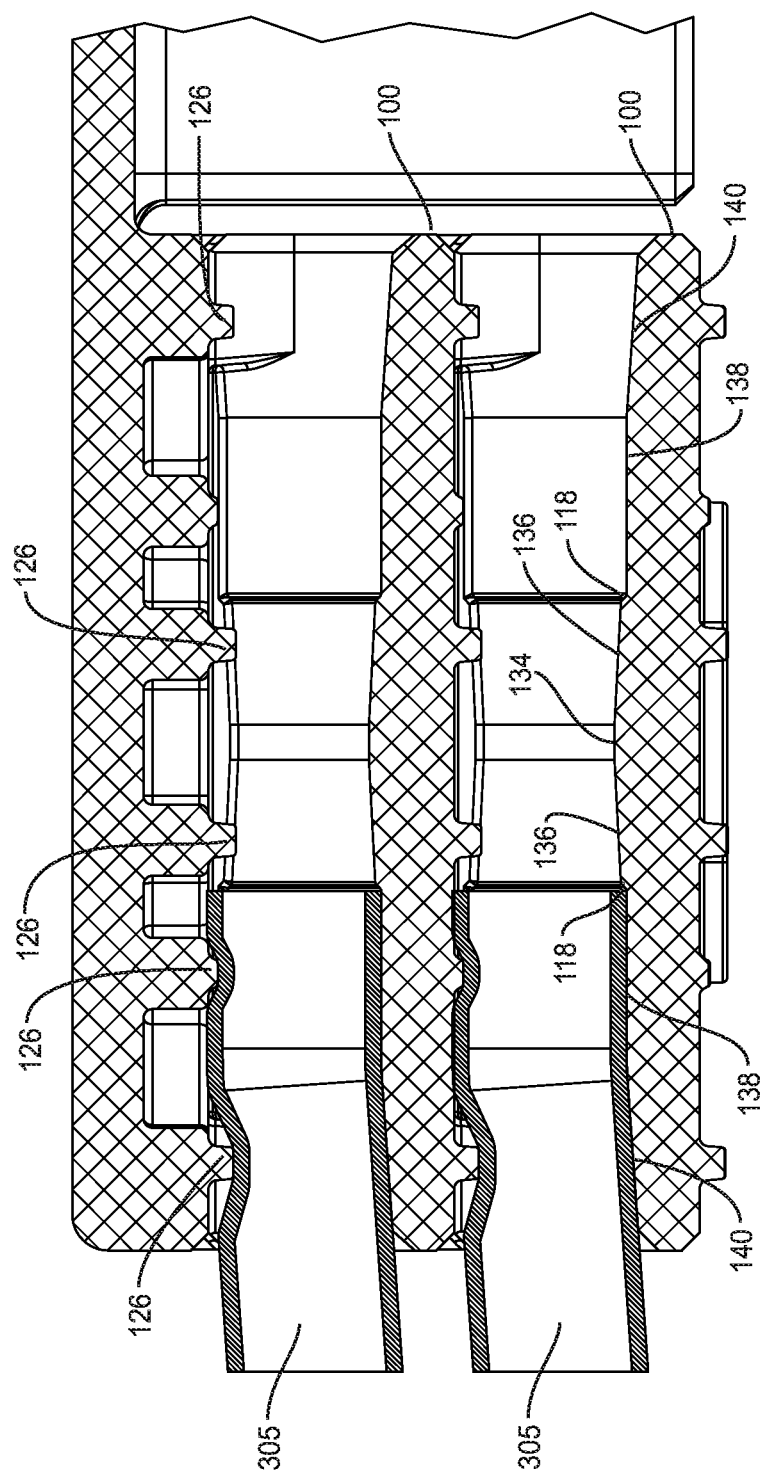
FIG. 7 depicts a cross-sectional view of an assembly of two fastening plates with a larger diameter fiber tube being pressed together by the fastening plates, according to an embodiment.

Referring to FIGS. 6-7, a cross-sectional view of an assembly with two of the fastening plates 100 is depicted. FIG. 6 depicts the assembly with a smaller diameter fiber tube (e.g., 8.5 mm) being pressed together by the two fastening plates 100. FIG. 7 depicts the assembly with a larger diameter fiber tube (e.g., 10.0 mm) being pressed together by the two fastening plates 100. According to an embodiment, each of the fiber tube receptacles 112 includes a centrally located elevated surface 134 and first sloped surfaces 136 that extend away from the centrally located elevated surface 134 downward to the step shaped transitions 118 adjacent to the centrally located elevated surface 134. This topography provides a "hill" in the fiber tube receptacle 112. In the case that the smaller diameter fiber tube is being secured by the fastening plates 100 (as shown in FIG. 6) this "hill" pushes the smaller diameter fiber tube towards the bottom side 102 of the immediately adjacent fastening plate 100.

Each of the fiber tube receptacles 112 may further include a recessed (relative to the hill) flat surface 138 on either side of the central "hill" that extends away from the step shaped transition 118 towards one of the first and second outer sidewalls 106 in a direction substantially parallel to the top and bottom sides 102, 104, and a sloped surface 140 that inclines downward from the recessed surface 138 to one of the first and second outer sidewalls 106. This topography allows for a larger diameter fiber tube (as shown in FIG. 7) to be easily inserted into the assembly, due to the gradual tapering effect of the sloped surfaces 140. The recessed surfaces 138 are higher than the sloped surface 140 and therefore push the larger diameter fiber tube towards the bottom surface of the immediately adjacent fastening plate 100.

Figure 8:
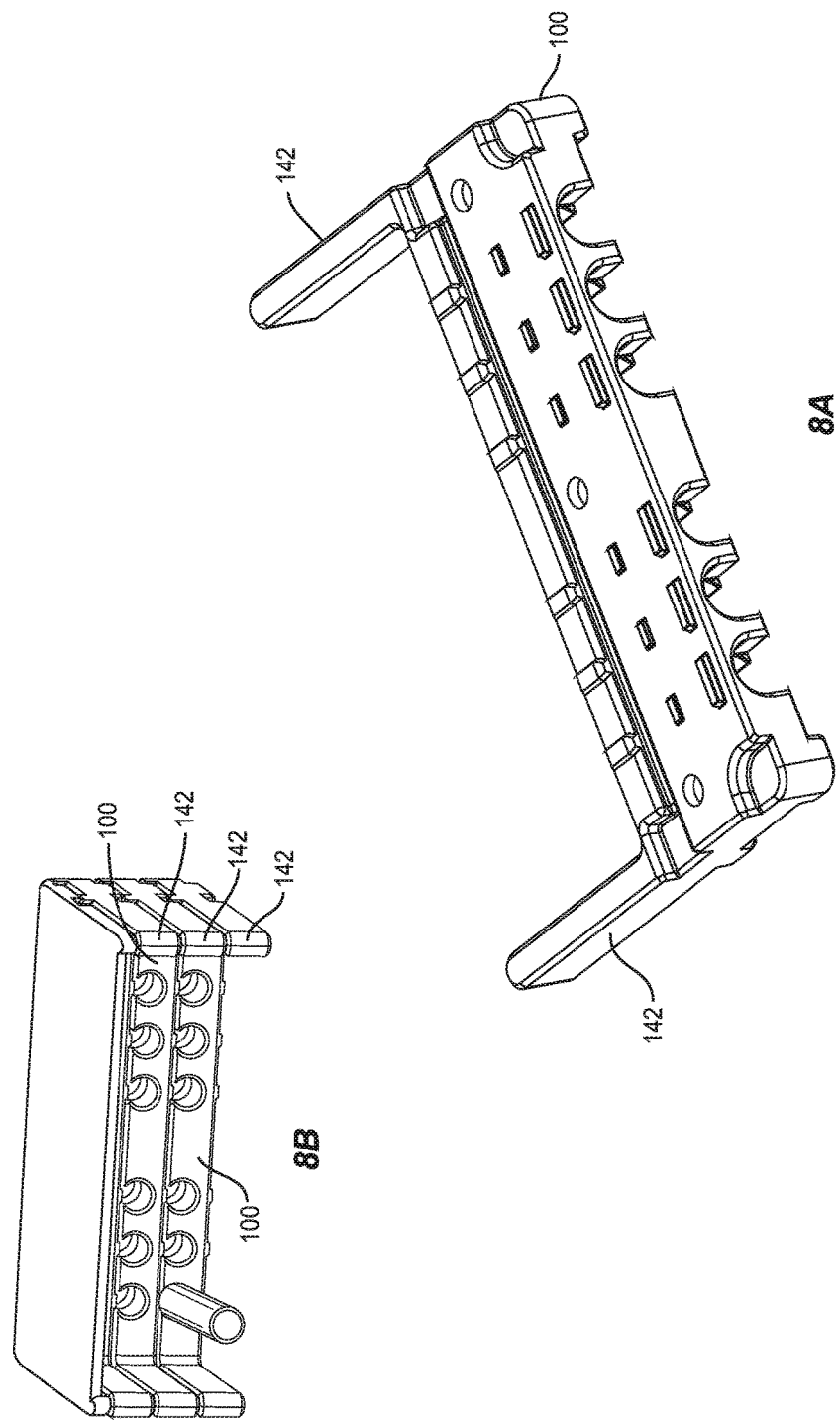
FIG. 8, which includes

Referring to FIG. 8, the fastening plate 100 is depicted with a pair of fingers 142 protruding away from end sides of the fastening plate 100. The ends sides of the fastening plate 100 may be coextensive with the pair of sidewalls 106 that are perpendicular to the first and second outer sidewalls 106. The fingers 142 provide a degree of protection for individual fibers that exit from the fiber tubes 304, which in turn exit from the fiber tube receptacles 112 of the fastening plates 100. Furthermore, the fingers 142 align with one another in a stack of fastening plates 100 to provide a protective shroud for the individual fibers that exit the fiber tube receptacles 112. As shown in FIG. 8B, an assembly with three of the fastening plates 100 is shown and the fingers 142 on the opposite sides of the fastening plate 100 stack together to provide a continuous protective cover for individual fibers that exit the assembly.

Figure 9:
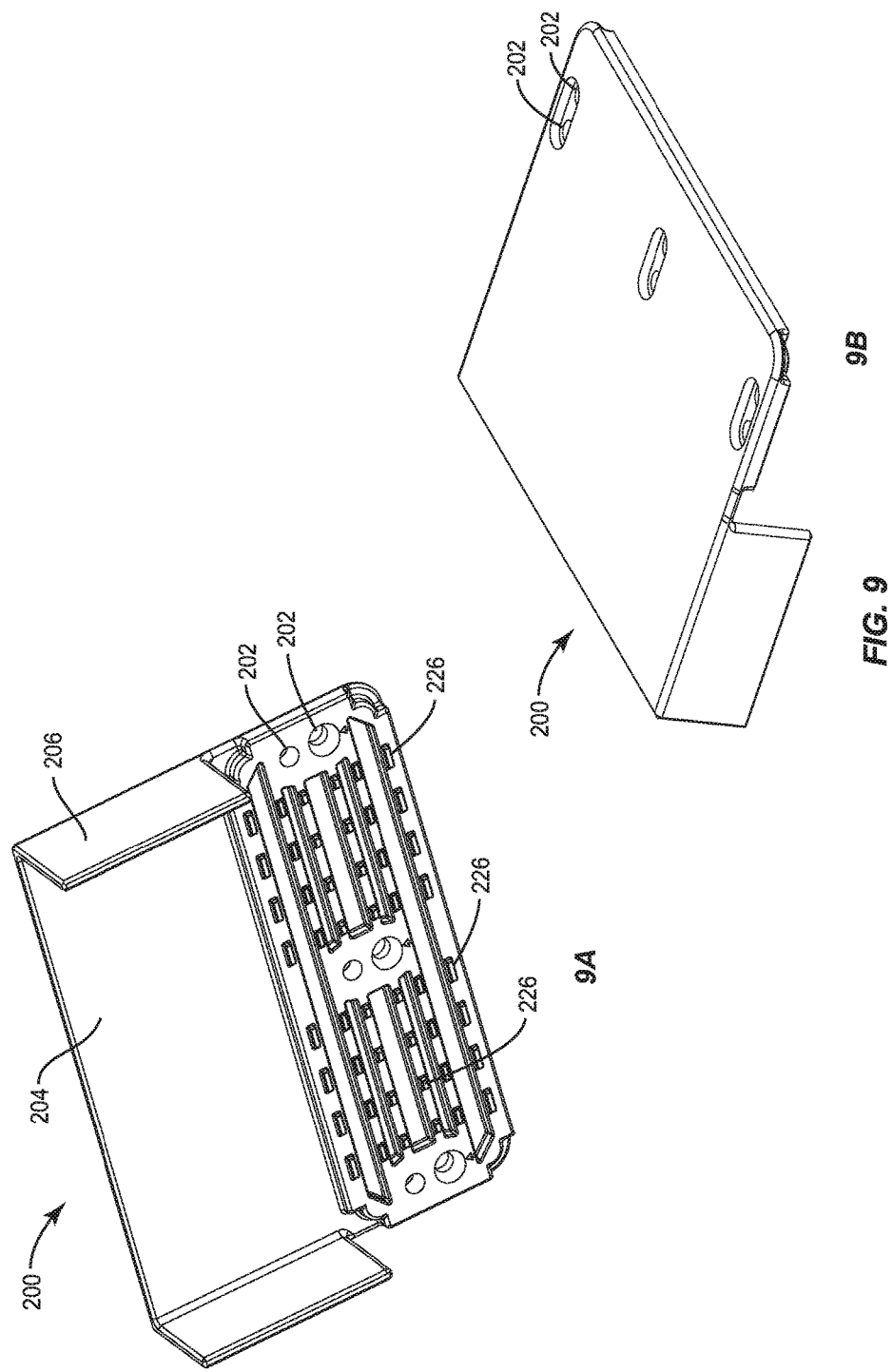
FIG. 9, which includes

Referring to FIG. 9, a lid 200 is depicted. The lid 200 can be placed on top of a stack of multiple fastening plates 100. The lid 200 includes correspondingly dimensioned faster perforations 202 so that the lid 200 can be secured to the anchor points 120 of a fastening plate 100 in the same manner that two of the fastening plate 100 can be secured together, as previously described. The lid 200 replicates the features of the bottom side 102 of one of the fastening plates 100 such that the fiber tubes 304 in the uppermost fastening plate 100 are gripped in a similar fashion. For example, the lid 200 may include a plurality of teeth 226 being arranged and dimensioned identically as the teeth 126 from the bottom side 102 of the fastening plate 100 described herein, as previously discussed with reference to FIG. 3. That is, the teeth 226 can be arranged in vertical columns, with each of the teeth 226 in the column having a varying height profile, and can be arranged in horizontal rows, with each of the teeth 226 in the row having a varying height profile. A planar section 204 of the lid 200 extends away from the region that includes the teeth 126.

The lid 200 provides a degree of protection for the individual fibers that exit the fiber tubes 304 that are secured by the fastening plates 100. That is, the lid 200 provides protection in the transitional region for individual fibers between the assembly of fiber plates 100 and the area to which the fibers are routed (e.g., a duct space). The lid 200 also includes wing structures 206 extending downward. Advantageously, the wing structures 206 provide a degree of protection to these individual fibers without expanding the lateral footprint of the assembly.

FIGS. 10-13 depict a system for retaining a plurality of fiber tubes that utilizes multiple ones of the fastening plates 100. Each of the fastening plates 100 may be substantially similar or identical to the fastening plate 100 described with reference to FIGS. 1-9. The fastening plates 100 are secured to one another by fasteners 302 (e.g., screws) extending through at least one of the anchor points 120.

Figure 4:
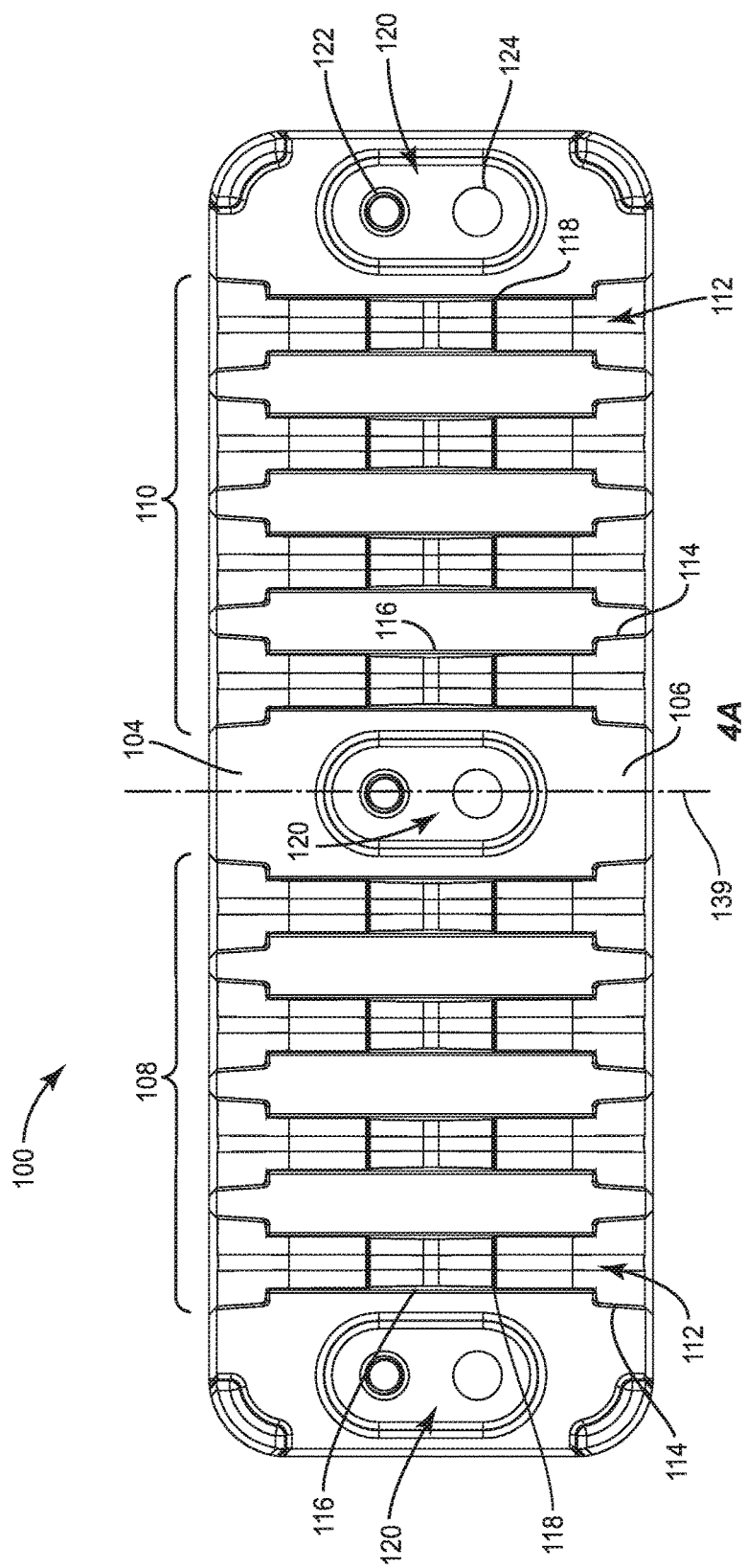
FIG. 4, which includes

In the embodiment of FIGS. 10-13, the first and second outer sidewalls 106 of the fastening plates 100 align with one another. That is, there is no staggering of the fastening plates 100 in the longitudinal direction of the fiber tube receptacles 112. Furthermore, because each of the fastening plates 100 in the system is identical, each of the outer sidewalls 106 of a first (lower) fastening plate 100 align with each of the outer sidewalls 106 of a second (upper) fastening plate 100 in the system. That is, an upper fastening plate 100 covers the same profile as a lower fastening plate 100. The symmetry with respect to the centerline 139 previously discussed with reference to FIG. 4 enables this alignment. Successive ones of the fastening plates 100 in the stack are rotated 180 degrees relative to one another, e.g., as illustrated in FIGS. 4A and 4B. In this way, the unthreaded fastener perforations of the first, second and third anchor points 120 of the upper fastening plate 100 align with the threaded fastener perforations of the lower fastening plate 100. Thus, a fastener 302 can be used to secure the fastening plates 100, and the unused fastener perforation 122, 124 in each anchor point 120 can be used for the next layer in the sequence. The positions of the fasteners 302 alternate back and forth in this assembly and sufficient clearance is provided for the heads of the fasteners 302. Despite the fact that the successive fastening plates 100 are rotated 180 degrees relative to one another, the same profile of the fiber tube receptacles 112 is presented.

Figure 10:
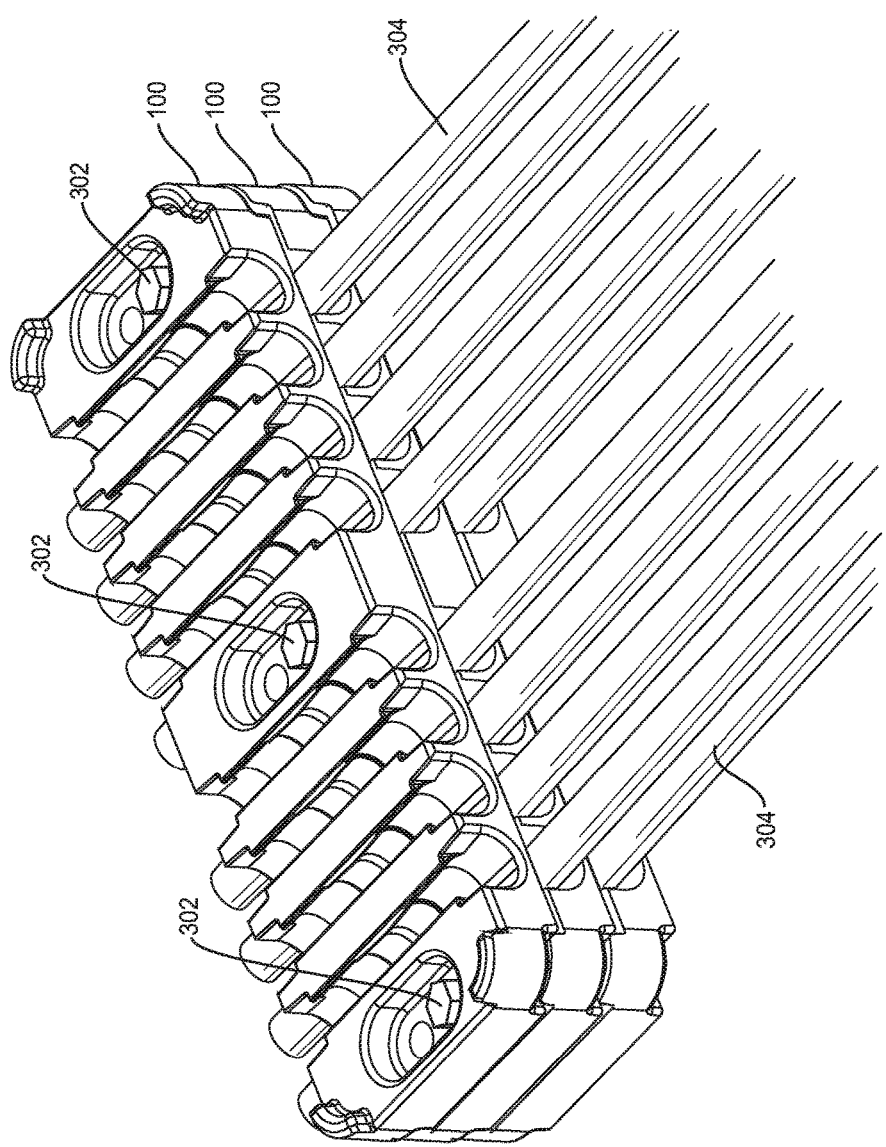
FIG. 10 depicts an assembly of two fastening plates with a smaller diameter fiber tube being pressed together by the fastening plates, according to an embodiment.

Referring to FIG. 10, cylindrical fiber tubes 304 are arranged in the fiber tube receptacles 112 of the fastening plates 100. The fastening plates 100 have been secured to one another using fasteners 302 in the anchor points 120. The fastening plates 100 therefore apply pressure to the cylindrical fiber tubes 304 and retain the cylindrical fiber tubes 304 between the fastening plates 100.

Referring FIG. 11, the system is depicted prior to securing two fastening plates 100 together. In the embodiment of FIG. 11A, larger fiber tubes 305 (e.g., 10.0 mm) have been placed in the fiber tube receptacles 112. The diameter of the larger fiber tubes 305 corresponds to the first diameter. That is, the outer longitudinal regions 114 of the fiber tube receptacles 112 of the fastening plates 100 are tailored to the diameter of the larger fiber tubes 305 such that the larger fiber tubes 305 are securely received in these regions. Further, with this tube diameter, ends of the cylindrical fiber tubes 304 are flush against the step shaped transitions 118 that are within the fiber tube receptacles 112. In the embodiment of FIG. 11B, smaller fiber tubes 304 (e.g., 8.5 mm) have been placed in the fiber tube receptacles 112. The diameter of the smaller fiber tubes 304 corresponds to the second diameter. That is, the central longitudinal regions 116 of the fiber tube receptacles 112 are tailored to the diameter of the smaller fiber tubes 304 such that the smaller fiber tubes 304 are securely received in these regions. Further, with this tube diameter, the cylindrical fiber tubes 304 extend completely through the fiber tube receptacles 112. The above provided diameters represent just two examples of potential sizes for the cylindrical fiber tubes 304.

The description of "smaller" and "larger" fiber tubes 304, 305 refers to a relative size as between two kinds of cylindrical fiber tubes 304, and not an absolute value. The fastening plates 100 can be tailored to any desired diameter values. For example, the first diameter of the fiber tube receptacles 112 can be corresponded to a fiber tube diameter of 16 mm and the and the second diameter of the fiber tube receptacles 112 can be corresponded to a fiber tube diameter of 12.7 mm. In this case, 12.7 mm is the "smaller" diameter and 16 mm is the "larger" diameter.

Referring back to FIGS. 6 and 7, the effect of the teeth 126 on the cylindrical fiber tubes 304 in the system is depicted. In the embodiment of FIG. 6, smaller fiber tubes 304 have been placed in the fiber tube receptacles 112. The cylindrical fiber tube 304 is pressed against the lower fastening plate 100 by central ones of the teeth 126 in one of the columns 128 of the upper fastening plate 100. According to an embodiment, the central ones of the teeth 126 from the second fastening plate 100 are arranged directly over the first sloped surfaces 136, when the system is assembled with the fastening plates 100 pressed together. That is, the central ones of the teeth 126 are longitudinally offset, relative to the center of the "hill" in the subjacent fastening plate 100. The central ones of the teeth 126 push the cylindrical fiber tubes 304 around the hill such that the cylindrical fiber tubes 304 are parallel with or close to parallel with the first sloped surfaces 136. Because the fiber tubes 304 bend around the hill and because the central ones of the teeth 126 are sufficiently tall to engage with the cylindrical fiber tube 304 in this position, a firm grip is maintained over the cylindrical fiber tubes 304.

In the embodiment of FIG. 7, a larger fiber tube 305 (e.g., 10.0 mm) has been placed in the fiber tube receptacles 112 and the larger fiber tube 305 is pressed against the lower fastening plate 100 by outer ones of the teeth 126 in one of the columns 128 of the upper fastening plate 100. Furthermore, the teeth 126 have a staggered height such that the outermost tooth 126 is taller than the immediately adjacent tooth 126, and substantially engages with the wall of the larger fiber tube 305. The immediately adjacent tooth 126 (i.e., the tooth 126 between the outermost tooth 126 and the teeth 126 disposed over the central "hill") does not protrude as much from the bottom side 102 of the fastening plate 100. This geometry provides leeway for the larger fiber tube 305 to be easily inserted into the fiber tube receptacles 112 up to the step shaped transition 118.

In general, the outer sides of the fiber tubes 304 will deform by the height of the tooth 126 minus any gap that exists between the fiber tubes 304 and a lower side of the fiber tube receptacles. The height profile of the teeth 126 discussed with reference to FIG. 4 can be tailored and optimized to enhance the grip and friction between the fastening plates 100 and the fiber tubes 304, while simultaneously making installations easy and efficient for the installer. For example, making the first group 127 of teeth 126 substantially taller than the rest of the teeth 126 in each column 128 ensures that a fiber tube 130 that is routed though the central region 116 (i.e., one of the smaller cable diameters) is sufficiently gripped by the immediately adjacent fastening plate 100. Furthermore, making the second group 129 of teeth 126 substantially taller than the rest of the teeth 129 in each row 130 helps counteract the bowing effect of the fastening plates 100. Because the fastening plates 100 can be formed from a material that is substantially pliable (e.g., plastic) and because the fiber tubes can be relatively rigid, it is possible that the fastening plates 100 will bow outward, with portions of the fastening plates 100 that are maximally separated from the anchor points 120 flexing the most. By making the second group 129 of teeth 126 slightly taller, the fiber tubes 304 will remain adequately gripped by and engaged with the teeth 126, despite the bowing of the fastening plate 100.

Figure 12:
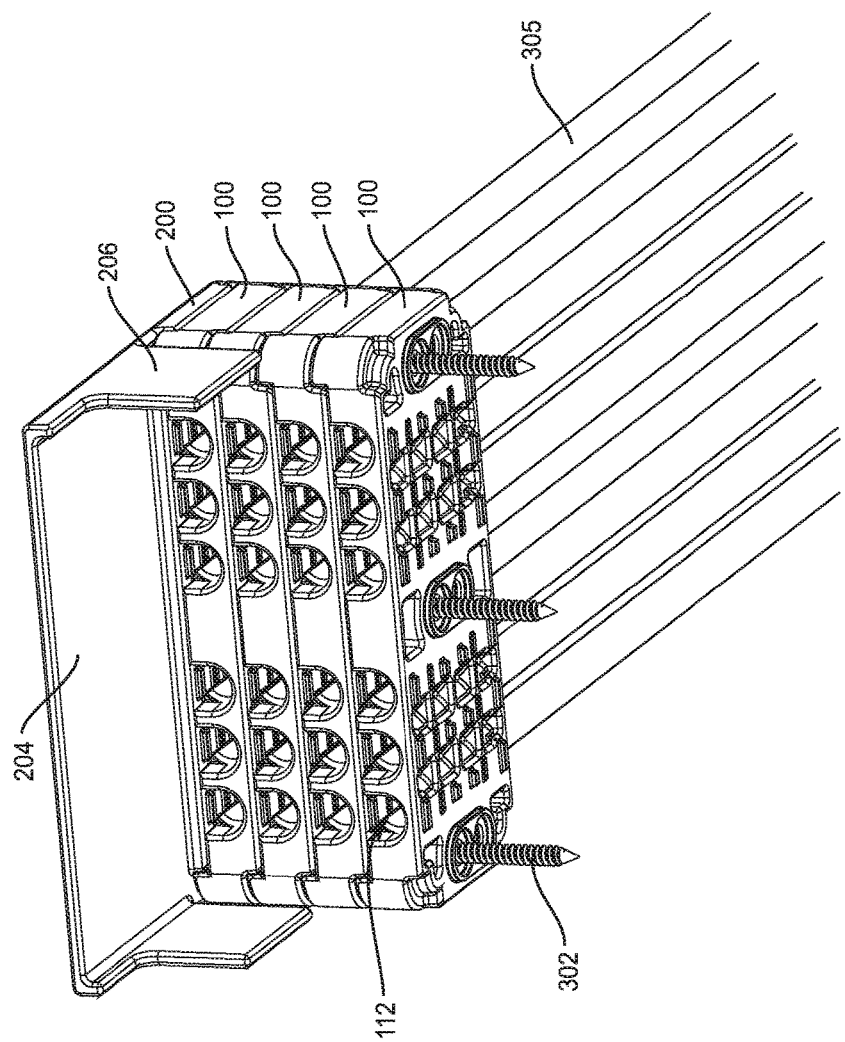
FIG. 12 depicts an assembly of fastening plates with a plurality of fiber tubes being pressed together by the fastening plates and a lid secured to the uppermost fastening plate, according to an embodiment.
Figure 13:
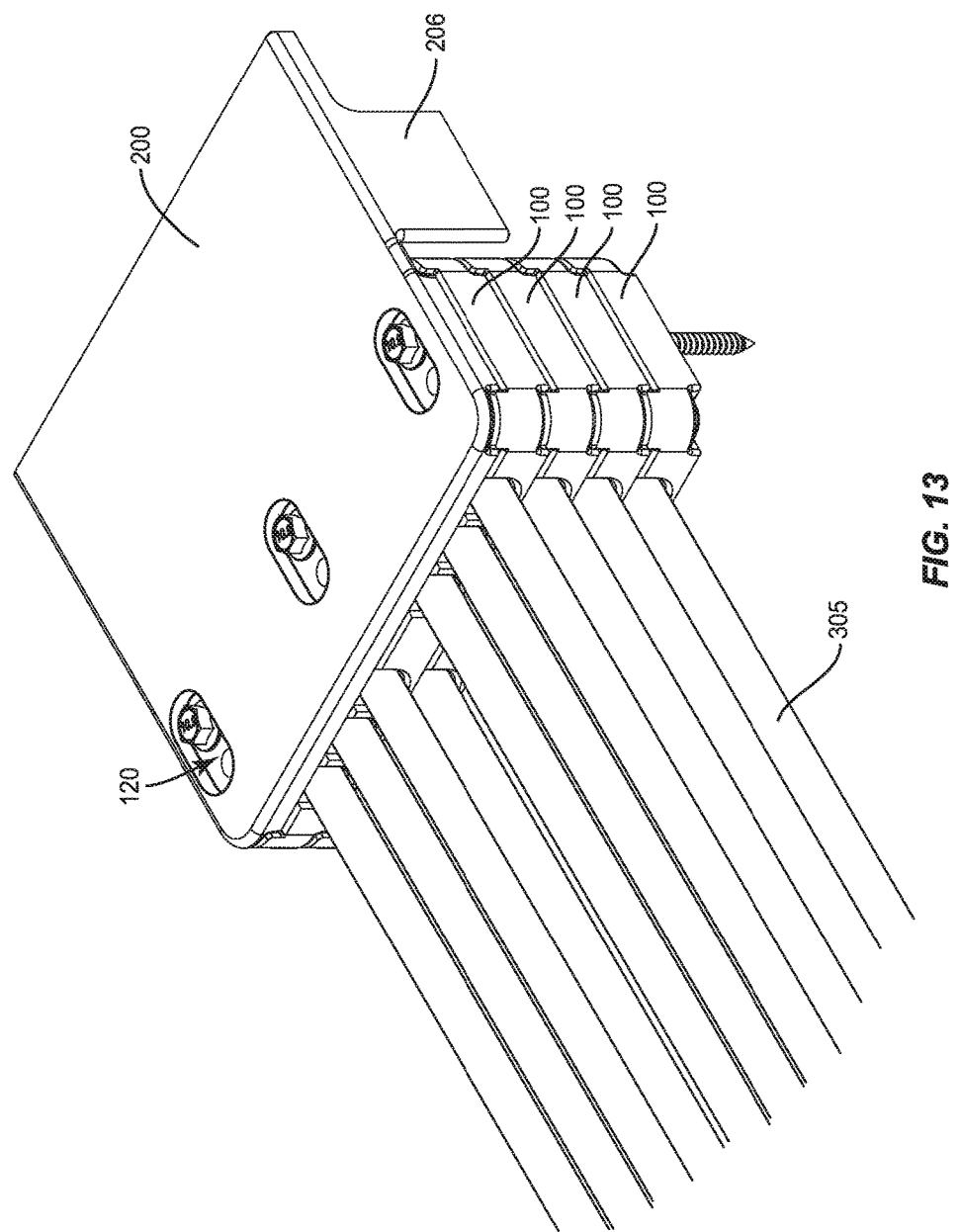
FIG. 13 depicts the assembly of FIG. 12 from another perspective, according to an embodiment.

Referring to FIGS. 12 and 13, a complete assembly with a plurality of stacked fastening plates 100, a lid 200, and multiple fiber tubes 305 is depicted. In this example, the larger diameter fiber tubes 305 (e.g., 10.0 mm) are received by the fastening plates 100 such that the fiber tubes do not completely extend through the fiber tube receptacles 112. The fiber tubes 305 in the fiber tube receptacles 112 of the uppermost fastening plate 100 are pressed against the uppermost fastening plate 100 by the lid 200, and are gripper by the teeth 226 from the lid 200 in a similar manner as previously discussed.

Figure 14:
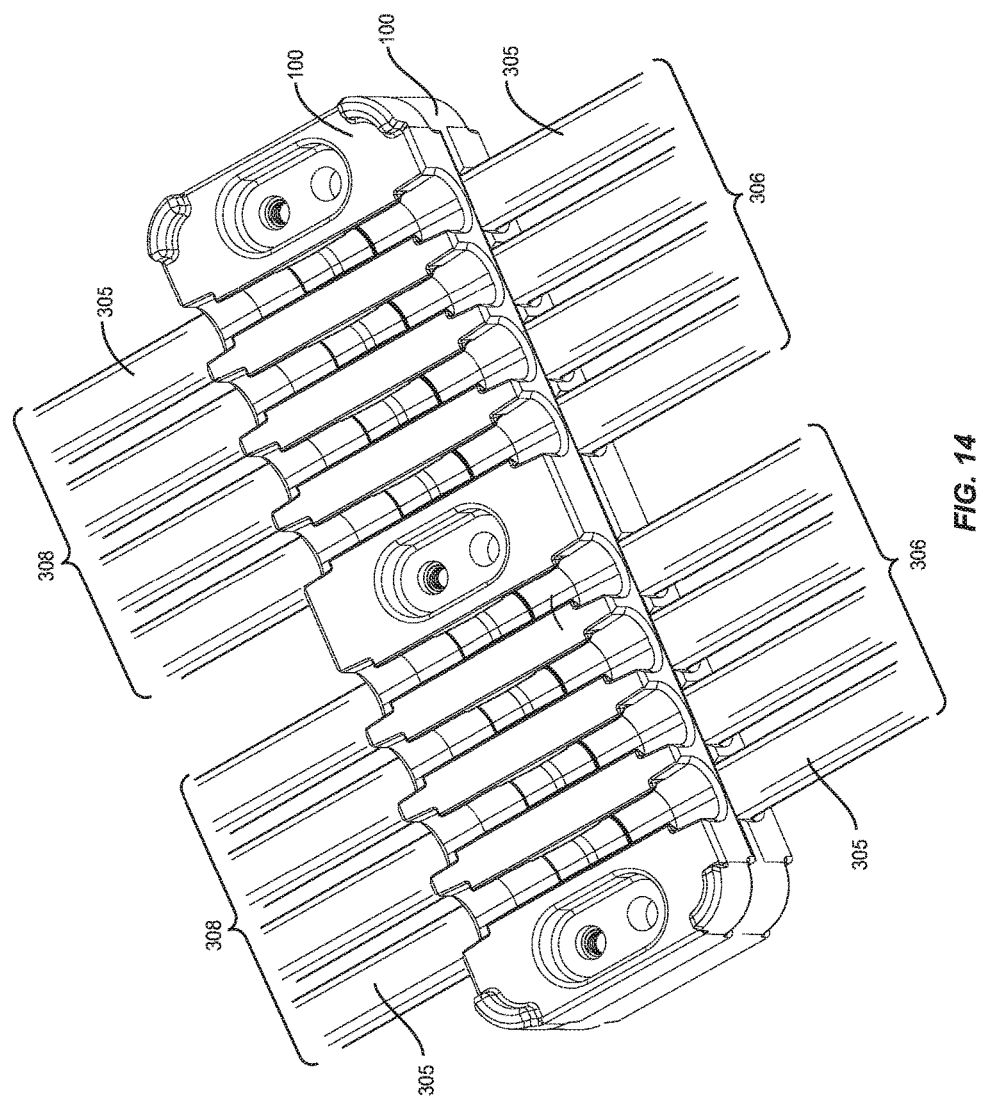
FIG. 14 depicts an assembly of two fastening plates with two sets of same diameter fiber tubes entering opposite sides of the assembly, according to an embodiment.

Referring to FIG. 14, an assembly of the fastening plates 100 is depicted, according to another embodiment. In this embodiment, two of the fastening plates 100 are used as a coupler to connect the fibers of separate fiber tubes 305 together. First sets 306 of the fiber tubes 305 enter the fiber tube receptacles 112 at one side of the assembly and second sets 308 of the fiber tubes 305 enter the fiber tube receptacles 112 at an opposite side of the assembly. According to an embodiment, the first and second sets 306, 308 include the larger diameter fiber tubes 305 such that the fastening plates 100 retain the first and second sets 306, 308 in the outer regions 114 of the fiber tube receptacles 112. More particularly, the first sets 306 of fiber tubes 305 enter the assembly at one side and terminate at the step shaped transitions 118 and the second sets 308 of the fiber tubes 305 enter the assembly at an opposite side and terminate at the opposite facing step shaped transition 118 within the fiber tube receptacles 112.

The coupler that is formed by the assembly of FIG. 14 may be used to add functional length to the fibers within the fiber tubes 305 in a secure and reliable manner. The interior fiber optic cables (e.g., loose buffer style fiber optic cable) are routed from the fiber tubes 305 in the first sets 306 to the fiber tubes 305 of the second sets 308 using the coupler as a protective cover. Furthermore, the central regions 116 of the fiber tube receptacles 112 provides a protected conduit for the interior fiber optic cables to be routed through such that the interior fiber optic cables are protected from the exterior environment. The assembly of FIG. 14 can be mounted to a flat surface, or may remain unsecured. In any event, the pressure applied by the teeth 126 on the first and second sets 306, 308 of fiber tubes 305 provides a secure connection that can withstand substantial pulling forces.

According to another embodiment, the first and second sets 306, 308 of fiber tubes 304 are the smaller diameter fiber tubes 304 and these fiber tubes 304 meet together in the central region 116 of the fiber tube receptacle 112.

The term "corresponds" requires an exact match or a close similarity, such as a ratio of 1.1:1. For example, if the diameter of the outer regions of the fiber tube receptacles corresponds to a 10.0 mm fiber tube diameter, the diameter of the fiber tube receptacles may be about 11 mm so that the outer regions of the fiber tube receptacles can accommodate the 10.0 mm fiber tube in a secure manner, but with sufficient leeway. Likewise, if the diameter of the inner regions of the fiber tube receptacles corresponds to an 8.5 mm fiber tube diameter, the diameter of the fiber tube receptacles may be about 9.35 mm so that the outer regions of the fiber tube receptacles can accommodate the 8.5 mm fiber tube in a secure manner, but with sufficient leeway.

The term "substantially" encompasses absolute conformity with a requirement as well as minor deviation from absolute conformity with the requirement due to manufacturing process variations, assembly, and other factors that may cause a deviation from the ideal. Provided that the deviations are not significant enough to prevent the structure from being assembled in the manner described herein, the term "substantially" encompasses any of these deviations.

Spatially relative terms such as "under," "below," "lower," "over," "upper" and the like, are used for ease of description to explain the positioning of one element relative to a second element. These terms are intended to encompass different orientations of the device in addition to different orientations than those depicted in the figures. Further, terms such as "first", "second", and the like, are also used to describe various elements, regions, sections, etc. and are also not intended to be limiting. Like terms refer to like elements throughout the description.

As used herein, the terms "having," "containing," "including," "comprising" and the like are open-ended terms that indicate the presence of stated elements or features, but do not preclude additional elements or features. The articles "a," "an" and "the" are intended to include the plural as well as the singular, unless the context clearly indicates otherwise.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. A device for retaining a plurality of fiber tubes, the device comprising:
   a bottom side, a top side, and outer sidewalls extending between the top and bottom sides;
   first and second groups of fiber tube receptacles formed in the top side and extending between first and second opposite facing ones of the outer sidewalls; and
   first, second and third anchor points, each of the anchor points comprising a pair of fastener perforations extending through the top and bottom sides;
   wherein the first and second anchor points are arranged outside of the first and second groups of fiber tube receptacles,
   wherein the third anchor point is arranged between the first and second groups of fiber tube receptacles,
   wherein each of the fiber tube receptacles has a first diameter throughout outer regions and a second diameter throughout a central region, the central region being disposed between the outer regions, the outer regions extending from the central region to one of the first and second outer sidewalls, and
   wherein the first diameter is greater than the second diameter.

2. The device of claim 1, wherein each of the fiber tube receptacles comprises step shaped transitions between the outer regions and the central region.

3. The device of claim 1, wherein each of the fiber tube receptacles comprises a flat section at a bottom of the partial cylinder, wherein the flat section extends between the first and second outer sidewalls.

4. The device of claim 1, wherein the central region of each of the fiber tube receptacles comprises a centrally located elevated surface and first sloped surfaces that extend downward from the centrally located elevated surface to the step shaped transitions.

5. The device of claim 1, wherein the outer regions of each of the fiber tube receptacles comprise a recessed surface that extends away from the step shaped transition towards one of the first and second outer sidewalls, and a sloped surface that extends downward from the recessed surface to one of the first and second outer sidewalls.

6. The device of claim 1, wherein the device is symmetrical with respect to a centerline that extends between the first and second outer sidewalls and is parallel to a longitudinal extension direction of the fiber tube receptacles, wherein the first, second and third anchor points each comprise first and second fastener perforations that are disposed parallel to the centerline, and wherein the centerline bisects the first and second fastener perforations of the third anchor point.

7. The device of claim 6, wherein the first fastener perforations of the first, second and third anchor points are threaded, and wherein the second fastener perforations of the first, second and third anchor points are unthreaded.

8. The device of claim 1, further comprising a plurality of teeth extending away from the bottom side, wherein the teeth are formed in columns, each of the columns being parallel to and aligned with one of the fiber tube receptacles.

9. The device of claim 8, wherein for each column of teeth, centrally located teeth extend further away from the bottom side than adjacent ones of the teeth that are arranged on either side of the centrally located teeth.

10. The device of claim 8, wherein the teeth are formed in rows that are perpendicular to the columns, each of the rows comprising a tooth that is aligned with a corresponding fiber tube receptacle in one of the first and second groups, and wherein, for each of the rows, central ones of the teeth extend further away from the bottom side than outer ones of the teeth that are arranged on either side of the central ones of the teeth.

11. The device of claim 1, further comprising and a pair of fingers protruding away from end sides of the device, the end sides being perpendicular to the first and second outer sidewalls.

12. A system for retaining a plurality of fiber tubes, the system comprising:
first and second fastening plates, each of the fastening plates comprising:
a bottom side, a top side, and outer sidewalls extending between the top and bottom sides;
first and second groups of fiber tube receptacles formed in the top side and extending between first and second opposite facing ones of the outer sidewalls; and
first, second and third anchor points, each of the anchor points comprising a pair of fastener perforations extending through the top and bottom sides;
wherein the first and second anchor points are arranged outside of the first and second groups of fiber tube receptacles,
wherein the third anchor point is arranged between the first and second groups of fiber tube receptacles, and
wherein the first and second fastening plates are secured to one another by fasteners extending through at least one of the anchor points, and
wherein the first and second outer sidewalls of the first and second fastening plates align with one another,
wherein the second fastening plate comprises a plurality of teeth extending away from the bottom side of the first fastening plate,
wherein the teeth on the bottom side of the second fastening plate are formed in columns, and
wherein each of the columns are parallel to and disposed directly above one of the fiber tube receptacles of the first fastening plate.

13. The system of claim 12, wherein the first and second fastening plates are substantially identical to one another, and wherein each of the outer sidewalls of the first fastening plate aligns with each of the outer sidewalls of the second fastening plate.

14. The system of claim 13, wherein each of the fiber tube receptacles has a first diameter in outer regions and a second diameter in a central region, the central region being disposed between the outer regions, the outer regions extending from the central region to one of the first and second outer sidewalls, wherein the first diameter is greater than the second diameter.

15. The system of claim 14, further comprising a first cylindrical fiber tube that is arranged in one of the fiber tube receptacles of the first fastening plate, wherein both of the first and second fastening plates apply pressure to the first cylindrical fiber tube so as to retain the cylindrical fiber tube between the first and second fastening plates.

16. The system of claim 15, further comprising a second cylindrical fiber tube that is arranged in the same fiber tube receptacle as the first cylindrical fiber tube, wherein the first and second cylindrical fiber tubes enter the assembly from opposite sides and terminate within the assembly, and wherein interior fiber optic cables from the first and second cylindrical fiber tubes are routed through the central region of the fiber tube receptacle that receives the first and second cylindrical fiber tubes.

17. The system of claim 15, wherein the first and second fastening plates further comprise a plurality of teeth extending away from the bottom side, wherein the teeth are formed in columns, each of the columns being parallel to and aligned with one of the fiber tube receptacles of the fastening plate from which the column is disposed on.

18. The system of claim 17, wherein a diameter of the first cylindrical fiber tube corresponds to the first diameter, wherein an end of the first cylindrical fiber tube is flush against one of the step shaped transitions, and wherein the first cylindrical fiber tube is pressed against the first fastening plate by outer ones of the teeth in one of the columns.

19. The system of claim 17, wherein a diameter of the first cylindrical fiber tube corresponds to the second diameter, wherein the first cylindrical fiber tube extends completely through the central region of one of the fiber tube receptacles, and wherein the first cylindrical fiber tube is pressed against the first fastening plate by central ones of the teeth in one of the columns from the second fastening plate.

20. The system of claim 17, further comprising a lid placed over the second fastening plate, wherein the lid comprises a plurality of teeth being arranged and dimensioned identically as the teeth from the first and second fastening plates.

21. A device for retaining a plurality of fiber tubes, the device comprising:
a bottom side, a top side, and outer sidewalls extending between the top and bottom sides;
first and second groups of fiber tube receptacles formed in the top side and extending between first and second opposite facing ones of the outer sidewalls; and
first, second and third anchor points, each of the anchor points comprising a pair of fastener perforations extending through the top and bottom sides;
wherein the first and second anchor points are arranged outside of the first and second groups of fiber tube receptacles, wherein the third anchor point is arranged between the first and second groups of fiber tube receptacles, wherein each of the fiber tube receptacles has a first diameter in outer regions and a second diameter in a central region, the central region being disposed between the outer regions, the outer regions extending from the central region to one of the first and second outer sidewalls, wherein the first diameter is greater than the second diameter, wherein each of the fiber tube receptacles comprises step shaped transitions between the outer regions and the central region, and wherein each of the fiber tube receptacles is shaped as a partial cylinder, wherein, in a cross-section of the fiber tube receptacle in a plane that is parallel to the first and second outer sidewalls, the fiber tube receptacles form a circular sector, and wherein an arc of the circular sector exceeds 180 degrees.

22. A system for retaining a plurality of fiber tubes, the system comprising:

first and second fastening plates, each of the fastening plates comprising:
a bottom side, a top side, and outer sidewalls extending between the top and bottom sides;
first and second groups of fiber tube receptacles formed in the top side and extending between first and second opposite facing ones of the outer sidewalls; and
first, second and third anchor points, each of the anchor points comprising a pair of fastener perforations extending through the top and bottom sides;

wherein the first and second anchor points are arranged outside of the first and second groups of fiber tube receptacles, wherein the third anchor point is arranged between the first and second groups of fiber tube receptacles, and wherein the first and second fastening plates are secured to one another by fasteners extending through at least one of the anchor points, and wherein the first and second outer sidewalls of the first and second fastening plates align with one another, wherein each of the fastening plates is symmetrical with respect to a centerline that extends between the first and second outer sidewalls and is parallel to the fiber tube receptacles, wherein the first, second and third anchor points each comprise first and second fastener perforations that are disposed parallel to the centerline, and wherein the centerline bisects the first and second fastener perforations of the third anchor point, wherein the first fastener perforations of the first, second and third anchor points are threaded, wherein the second fastener perforations of the first, second and third anchor points are unthreaded, wherein the first and second fastening plates are secured to one another by a threaded fastener, the threaded fastener extending though the second fastener perforation of the second fastening plate and the first fastener perforation of the first fastening plate.

* * * * *